Patented May 19, 1925.

1,538,504

UNITED STATES PATENT OFFICE.

FREDERICK C. ATKINSON, OF INDIANAPOLIS, INDIANA.

PROCESS OF TANNING HIDES.

No Drawing.  Application filed June 26, 1919. Serial No. 306,780.

*To all whom it may concern:*

Be it known that I, FREDERICK C. ATKINSON, a citizen of the United States, residing at Indianapolis, in the county of Marion and State of Indiana, have invented certain new and useful Improvements in Processes of Tanning Hides, of which the following is a specification.

This invention relates to the utilization of waste material such as corn cobs, cottonseed hulls, oat hulls, rice hulls, etc., and more especially to the obtaining therefrom, by suitable treatment of the liquid products of destructive distillation of the same, of a liquor which is suitable for tanning, it being among the objects of this invention to produce a tanning liquor which is cheap, rapid and effective in its action.

I have found that, by subjecting such waste material as corn cobs to destructive distillation, there is obtained an acid liquor containing acetic acid and some other acetic and aldehyde bodies as set out in my co-pending application Serial No. 300,129, now Patent No. 1,457,484 dated June 5, 1923. Some tar is also obtained and a third product is gas, largely carbon-monoxid, the separation of which from the tar is a simple matter and is done mechanically, as is the separation of the tar from the acid liquor. However, I find the acid liquor contains dissolved a further quantity of tar of an oily nature which is readily separated to a partial degree by "salting out." This salting out can be done by salts such as calcium chlorid or sodium chlorid, but I prefer the latter, the tar oil thus drawn out of the solution rising to the surface. I usually separate the acid liquor with sodium chlorid, or common salt, and allow a few days for a complete separation of the tar layer. The lower acid layer is separated as a clear liquor with an acidity corresponding to approximately 5% acetic acid and yields a further quantity of volatile oily substances by washing with immiscible solvents, as ether, chloroform, etc., but this acidity is influenced to a large degree by the original moisture in the corn cobs, wet corn cobs giving a more dilute acetic acid than is obtained in dry corn cobs.

I have found that this salted out and washed acetic acid liquor still contains certain substances which possess tanning properties on untanned leather or hides, and which are believed to contain depsides and pyrocatechol esters. These substances and others at present not definitely known may be classed as impurities, which are not separated out by distillation and which are also very difficult to precipitate in insoluble form. The removal of these substances to at least a considerable degree, the resulting purification of the acid liquor, and the utilization of the method of said purification is the subject of my present invention.

I accomplish this by adding to the liquor containing said substances a quantity of animal matter as skins, which I have discovered have an affinity for these certain impurities of the acid liquor. When the skins are treated with liquor of the acidity of that which results from the distillation of corn cobs I find they become soft and have the appearance of skins subjected to boiling water for a long time; they lose their tenacious character and after a time become jellylike. In experimenting to overcome this condition I have discovered that the addition of inorganic salts such as sodium chlorid is completely effective in protecting the skins against this softening action of the acid liquor and the use of sodium chlorid, or some equivalent, therefore forms a part of my present invention, the broad invention of using animal matter to take up the impurities in the liquor being the subject of my co-pending application. The amount of sodium chlorid may be as high as that which will produce a saturated solution, say 30%. By the use of sufficient skins in this process I not only effectively tan them, or convert them into leather and in a very much shorter space of time than by other tanning processes commonly employed, but I also obtain a liquor partially decolorized and which on distillation yields an acetic acid partially purified and which may be converted into a salt of acetic acid by simply adding a basic chemical to neutralize the acid and evaporating it to dryness.

Altho I have described my invention specially as applied to the liquor obtained from the destructive distillation of corn cobs, I intend to use other starting materials such as cottonseed, oat, rice, or other hulls, and I may even utilize the liquor resulting from the destructive distillation of hardwoods such as oak, hickory, etc., all of which I herein call waste cellulose containing substance, for the tanning of animal matter and simultaneous purification of the liquor.

I claim:

1. The process of tanning animal skins which consists in removing hair and fleshy matters therefrom and subjecting the skins thus prepared to the action of the acid distillate obtained from the destructive distillation of waste cellulose containing substance.

2. The process of tanning animal skins which consists in subjecting same to the tanning action of an acid liquor obtained by the destructive distillation of corn cobs and similar substances and containing a relatively high percentage of soluble inorganic salts.

3. The process of tanning animal skins which consists in saturating the acid liquor obtained in destructive distillation of waste cellulose substance with soluble inorganic salts to protect skins against the softening action of the acid of this liquor, and then subjecting said skins to the tanning action of the depsides or tanning principles contained in the acid liquor thus prepared.

4. The process of tanning animal skins which consists in subjecting same to the action of the acid distillate from the destructive distillation of corn cobs.

5. The process of tanning animal skins which consists in saturating the acid liquor obtained in destructive distillation of corn cobs with soluble inorganic salts to protect the skins against the softening action of the acid of this liquor, and then subjecting said skins to the tanning action of the leather-combining reagents in said liquor.

6. A process of tanning animal skins which comprises obtaining acid liquor from destructive distillation of cellulose containing substance, removing oil and tar therefrom, adding a soluble inorganic salt to the liquor, and subjecting the animal skins to the action thereof, substantially as set forth.

7. A tanning medium comprising an inorganic salt and the acid liquor obtained by destructive distillation of cellulose containing material, said liquor having its tarry and oily matters removed, substantially as set forth.

8. The process of tanning animal skins, which comprises saturating with salt the acid liquor obtained from the destructive distillation of cellulose material to prevent softening of the skins, removing the oily and tarry material that separates out of the liquor, and immersing the skins in the liquor, substantially as set forth.

In witness whereof, I have hereunto set my hand and seal at Indianapolis, Indiana, this 24th day of June, A. D. nineteen hundred and nineteen.

FREDERICK C. ATKINSON. [L. S.]

Witnesses:
 H. C. BIERMAN,
 M. L. THULER.